United States Patent [19]

Andreassen et al.

[11] 3,838,936
[45] Oct. 1, 1974

[54] ADJUSTABLE DAMPING DEVICE, IN PARTICULAR FOR BORING BARS AND THE LIKE

[75] Inventors: Lauritz Andreassen, Buvika, Norway; Godthard Rosdal, deceased, late of Saupstad, Norway by Inger Rosdal, widow; Hans Kristian Holmen, Sandvika, Norway

[73] Assignee: A/S Trondhjems Nagle- & Spigerfabrik, Trondheim, Norway

[22] Filed: Jan. 19, 1973

[21] Appl. No.: 325,119

[30] Foreign Application Priority Data
Jan. 21, 1972 Norway................ 148/72

[52] U.S. Cl.................. 408/143, 90/11 A
[51] Int. Cl............................. B23b 47/00
[58] Field of Search...... 408/143; 90/11 A; 188/1 B; 64/1 V; 82/DIG. 9

[56] References Cited
UNITED STATES PATENTS
2,596,821  5/1952  Parkins.......................... 408/143 X
3,242,791  3/1966  Smith................................ 188/1 B
3,559,512  2/1971  Aggarwal........................... 408/143
3,642,378  2/1972  Hahn et al......................... 408/143

*Primary Examiner*—Gil Weidenfeld
*Attorney, Agent, or Firm*—Wenderoth, Lind & Ponack

[57] ABSTRACT

An adjustable damping device, in particular for boring bars and the like, comprising a damping member arranged in an axial bore in the boring bar and coupled thereto through one or more annular spring elements of resilient material, for instance rubber. The spring elements are adapted to be compressed axially in a controllable way between surfaces of engagement at each end of the damping member thereby to vary the stiffness of the spring members. There is provided a substantially conical end face on at least one spring element and/or on one or both adjoining engagement surfaces, so that between each spring element and at least one adjoining engagement surface there is formed a gap with a substantially wedge-shaped cross-section.

5 Claims, 4 Drawing Figures

PATENTED OCT 1 1974　　3,838,936
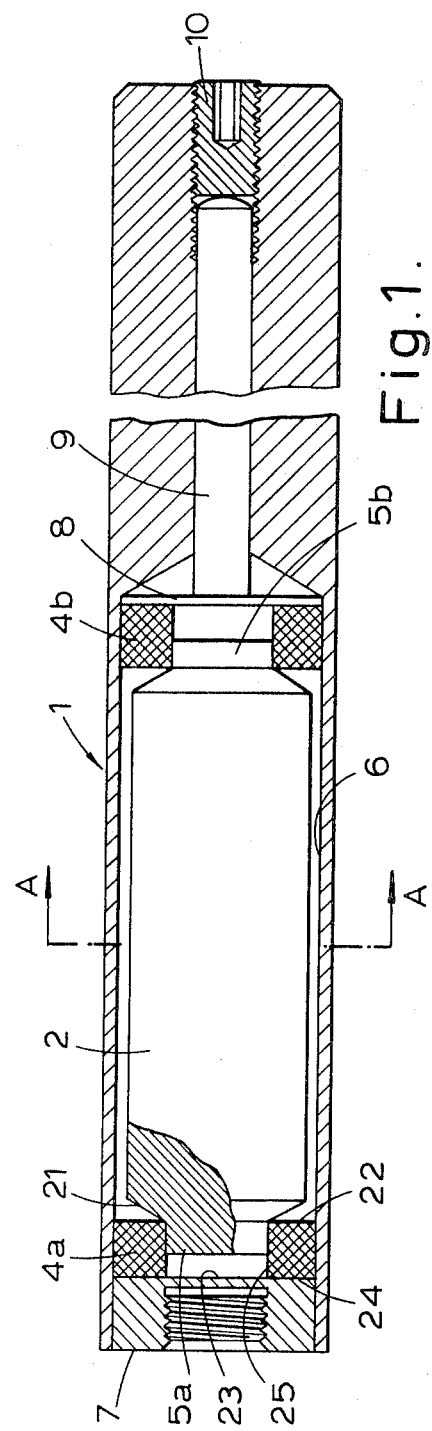
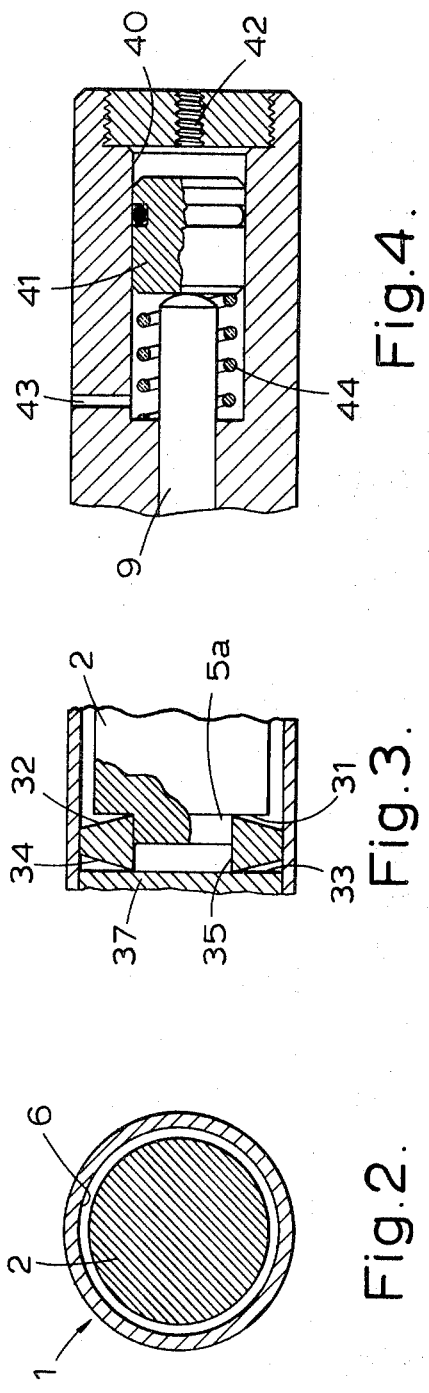

ADJUSTABLE DAMPING DEVICE, IN PARTICULAR FOR BORING BARS AND THE LIKE

This invention relates to an adjustable damping device being in particular intended for use in boring bars and similar tool holding rods which are used in machine tools. It may also be possible to use the damping device for damping oscillations in other machine components or complete machines, or possibly machine assmblies, for instance compressors, grinding machines, lathes, milling machines and other machine tools. A further possibility consists therein that the damping device can be designed for detachable application to or engagement with a workpiece, for instance during external turning of long axles being subject to undesired vibrations. The device is of the type which comprises a damping member arranged in an axial bore in the boring bar and is coupled thereto through one or more spring elements in the form of for instance disks or annular rings of resilient material such as rubber. Possibly there may be introduced a fluid in the space between the damping member and the bore so as to contribute to the damping effect.

A damping device of the above general type is for instance known from Norwegian Pat. specification No. 120,609. The present invention relates to an improvement of such damping devices, in particular for the purpose of improving the adjustment possibilities in order that the boring bar in practice can be adjusted as conveniently as possible for obtaining the most favourable damping effect for the conditions concerned. It is very important that such damping devices for boring bars can be easily and quickly adjusted by the machine operator, since the detrimental or annoying oscillations which can arise, cannot usually be predicted so that it is necessary to carry out relatively frequent adjustments in order to obtain at any time a sufficiently good damping effect.

For obtaining the above purposes the adjustable damping device according to the invention is characterized therein that there is provided a substantially conical end face on at least one spring element and/or on one or both cooperating supporting surfaces so that between each spring element and at least one cooperating supporting surface there is formed a gap with a substantially wedge-shaped cross-section.

This design of the active surfaces results therein that both the damping force and the spring force are continuously adjustable, whereby also the damping force and the spring force can be varied simultaneously for obtaining in an advantageous way the most favourable conditions for the damping device under the various conditions of vibration or oscillation which can exist. When it is stated above that a substantially conical end face is provided, this is meant to comprise also surfaces being generally conical, but which can deviate more or less from the purely conical shape, for instance by being step-shaped, having a concave or convex curvature or being piece-meal conical with different conicities.

In a preferred embodiment of the device according to the invention the spring element has a rectangular cross-section and the damping member has a cooperating conical end surface. With such a shape of the cooperating surfaces which generally face each other axially, on the spring elements and the damping member or the end limiting surfaces of the bore, respectively, the adjustment during axial compression of the spring elements will bring the surface of engagement between these and the cooperating supporting surfaces to increase, which leads to a higher damping effect, as explained below. Obviously, the necessary conicity can be provided on one or more of the cooperating surfaces depending upon the desired degree of progressivity in the damping effect and other considerations such as manufacturing considerations and so on. It shall be emphasized that during the axial adjustment movement for compressing the spring elements, the surfaces of engagement between these and the cooperating supporting surfaces increase at the same time as the surface pressure distribution is changed, which takes place in such a way that the surface pressure will always have a zero value at the top of the deformation wedge and a higher value where the spring element is more strongly deformed. During the axial adjustment movement of the damping member there will therefore always take place a sliding movement between the spring element and the damping member at least over some portions of the supporting surface. The resilient spring elements have a combined function in the device according to this invention, since they are combined damping and spring elements which when they are adjusted, give a simultaneous variation in the spring stiffness and the active velocity-determined frictional resistance between the damping member and the elements. Finally, in this connection it shall be added that the geometrical shape of the gap with wedge-shaped cross-section is changed during the adjustment operation.

Although the damping device according to the invention in the first place is based on completely or partly filling of a damping fluid in the space between the bore and the damping member, it is quite obvious that the invention is not limited to such embodiments. The lubricating effect which a fluid possibly involves, can, however, be an advantage to the effect of the varying engagement area between the spring elements and the supporting surface concerned, for instance on the damping member.

In the following the invention shall be explained more in detail with reference to the drawing, in which:

FIG. 1 shows a partial longitudinal section through a boring bar provided with a damping device according to a preferred embodiment of the invention, FIG. 2 shows a cross-section according to the line A—A in FIG. 1, FIG. 3 shows a partial cross-section of a modified embodiment of the device in FIG. 1, and FIG. 4 shows a cross-section of an alternative embodiment for pneumatic or hydraulic adjustment of the damping device.

The boring bar 1 in FIG. 1 has an axial bore 6 adapted to accommodate a damping member 2 the mounting or supporting of which is mainly provided by annular spring elements 4a and 4b at the respective ends of the damping member 2. These annular rings which can for instance be made of rubber or another correspondingly resilient material, are adapted to cooperate with end extensions 5a and 5b respectively, of reduced diameter at each end of the damping member 2. The rubber rings 4a and 4b lie in engagement with the bore 6 with their outer peripheries and are further supported in the axial direction at the outer end of the boring bar 1 by means of the inwardly facing surface on a front member 7, and at the inner end by a clamping disk 8 which is displaceable in the axial direction by means of a control rod 9 which is actuated by an adjustment screw 10 at the innermost or right-hand end of the boring bar 1, as shown in FIG. 1. The front member 7 comprises means for mounting a tool holder, for instance a suitably threaded hole.

FIG. 4 shows an alternative embodiment in which the adjustment of the rod 9 is effected pneumatically or hydraulically. For this purpose there is at the inner end of the boring bar 1, instead of the screw 10, provided a cylinder 40 in which a piston 41 is adapted to be displaceable under the influence of a pneumatic or hydraulic pressure fluid being supplied through a passage 42 at the end of the boring bar. The passage 42 can possibly be connected to the outer fluid system through a rotatable coupling, which makes adjustment possible during operation of a rotating boring bar. A venting passage 43 is shown at the inner end of the bore 40. Further, there is shown a helical spring 44 which is compressed between the bottom of the bore 40 and the inner end of the piston 41. This spring serves to facilitate the reverse or releasing control movement. It will be realized that the pneumatic or hydraulic adjustment arrangement shown in FIG. 4, involves operational and functional advantages.

In FIG. 1 the rubber rings 4a and 4b have a rectangular cross-sectional shape of which three sides are adapted to be in close engagement with adjoining, co-operating surfaces in the device, i.e. the bore 6, the end extensions 5a and 5b, and the end face 23 on the front member 7 and the end face of the clamping disk 8, respectively. As shown for rubber ring 4a in FIG. 1, the inwardly facing end surface 22 thereof does not in its entirety lie closely in engagement with the adjoining end face 21 of the damping member 2, since this end face 21 has a conical shape. A corresponding shape is shown at the other end of the damping member 2. This particular arrangement is related to the adjustment possibility provided by the clamping disk 8 together with the control rod 9 and the adjustment screw 10.

When the adjustment screw 10 is screwed inwardly, the clamping disk 8 is displaced inwardly into the bore 6 and compresses rubber rings 4a and 4b. With the illustrated conical shape of the end faces of the damping member 2 there will then take place a deformation of the rectangular cross-section of the rubber rings so that these will have an increasing surface engagement area against the end faces of the damping member. With movement this leads to an amplitude-dependent and monotonously increasing, oppositely directed frictional force giving an increased damping effect which at least in part is presumed to be due to the above increase of the surface engagement area between the rubber rings and the end faces of the damping member. The pressure at the surface of the rubber in this engagement area increases from a value approximately equal to zero at the outermost point, to a maximum value which is probably found at the innermost portion at the end extensions 5a and 5b, and with the increase of the engagement area the total frictional force will be larger, whereby the damping effect is amplified.

Simultaneously with the above described adjustment of the damping force there will also take place a change in the spring force as a consequence of the larger degree of enclosure of the spring element when this is compressed between the bore 6, the end face and the end extension of the damping member and the clamping disk 8, and the end face 23 and the front member 7, respectively.

FIG. 3 shows a modified embodiment in which the effect just described is obtained in a somewhat different way. Thus, in FIG. 3 the rubber rings have a trapezoidal cross-section with two conical side faces 32 and 34 adapted to cooperate with a plane end face 31 on the damping member 2, and at the other side with a plane surface 33 on the inwardly facing end of the front member 37. As a result of the two conical faces 32 and 34 on the rubber ring in FIG. 3, compression of the rubber ring shown there, during adjustment as described above, will be able to cause a stronger progressive increase of the damping effect of the rubber ring than in the embodiment described above. This effect could possibly be further accentuated by providing conical surfaces of engagement also at the end of the damping member and/or the front member.

With reference to the drawing there is described above a boring bar comprising a single damping member with a spring element at each end. The solutions provided by the present invention, can of course, also be applied in damping devices in which more than one damping member is involved, and these damping members can possibly have common intermediate spring elements. When only one damping member is used, embodiments can also be thought of in which this is suspended by means of only one spring element. Also other modifications of the embodiments shown are possible, for instance by eliminating the illustrated extensions 5a and 5b protruding into the spring elements 4a and 4b, which would result in a less progressive increase in the spring force of the spring elements when compressed during adjustment.

Finally, it is practical in an embodiment for boring bars and with for instance two spring elements of which only one is adjustable, to let this be the outermost one, i.e. the one being subject to the largest oscillation amplitudes.

What is claimed is:

1. An adjustable damping device for a boring bar, comprising:
    a damping member fully enclosed in an axial bore in the boring bar;
    at least two annular spring elements of resilient material positioned between said damping member and said boring bar and each of said spring elements contacting both said damping member and said boring bar at surface of engagement respectively thereof;
    means for axially compressing each of said spring elements in a controllable manner at said surfaces of engagement to thereby vary the stiffness of said spring elements,
    at least one of said surfaces of engagement being a substantially conical end face, such that at least one gap is formed having a substantially wedge shaped cross section with the longitudinal axis of said wedge shape being generally radial relative to said boring bar, said at least one gap being defined by said at least one conical end face surface of engagement and the surfaces contacting therewith.

2. The device of claim 1 wherein at least one of said surfaces of engagement of said damping member surface and the associated contacting surface of said annular spring element surface is a substantially conical end face.

3. A device as claimed in claim 2, including fluid means for adjusting said damping member.

4. A device as claimed in claim 2, wherein each of said spring elements has a rectangular cross-section, and said damping member has an adjoining conical end face.

5. A device as claimed in claim 2, wherein said damping member has an end extension adapted to protrude into each cooperating spring element.

* * * * *